United States Patent [19]
Guillet

[11] Patent Number: 5,979,125
[45] Date of Patent: Nov. 9, 1999

[54] FOLDABLE AND MOBILE STEPS OR BLEACHERS STRUCTURE

[75] Inventor: Gilles Guillet, Lingolsheim, France

[73] Assignee: Guillet S.A., Molsheim, France

[21] Appl. No.: 08/796,622

[22] Filed: Feb. 7, 1997

[51] Int. Cl.[6] .................................................. E04H 3/12
[52] U.S. Cl. .............................. 52/143; 52/10; 296/26.02
[58] Field of Search .............................. 296/26.01, 26.02, 296/26.03, 26.05, 26.11, 26.15; 52/7, 8, 9, 10

[56] References Cited

U.S. PATENT DOCUMENTS

| | | | |
|---|---|---|---|
| 5,152,109 | 10/1992 | Boers | 296/26.02 X |
| 5,375,899 | 12/1994 | Wright | 296/26.15 X |

FOREIGN PATENT DOCUMENTS 2206364  1/1989  United Kingdom ........................ 52/9

*Primary Examiner*—Andrew C. Pike
*Attorney, Agent, or Firm*—Abelman, Frayne & Schwab

[57] ABSTRACT

A system of grandstand with foldable bleachers, comprises an under-frame (1) mounted on wheels (2) and supporting a central horizontal floor (3). The floor (3) is provided with upright elements (8, 9), upon which are externally mounted, around horizontal axis (11, 12), two pivotable longitudinal lateral floors (15, 16), which can pivot between a first configuration in which they are folded one towards the other to form a space assembly meeting the legal dimension requirements which apply to trailers, and which can be hauled by a vehicle comprising the underframe (1) and wheels (2, and a second configuration in which they are unfolded externally at different levels to form a generally plane and oblique structure upon which seats (17) and (18) are mounted as bleachers forming an autonomous grandstand. An apparatus is also provided for folding and unfolding said floors in a unique manual operation.

13 Claims, 5 Drawing Sheets

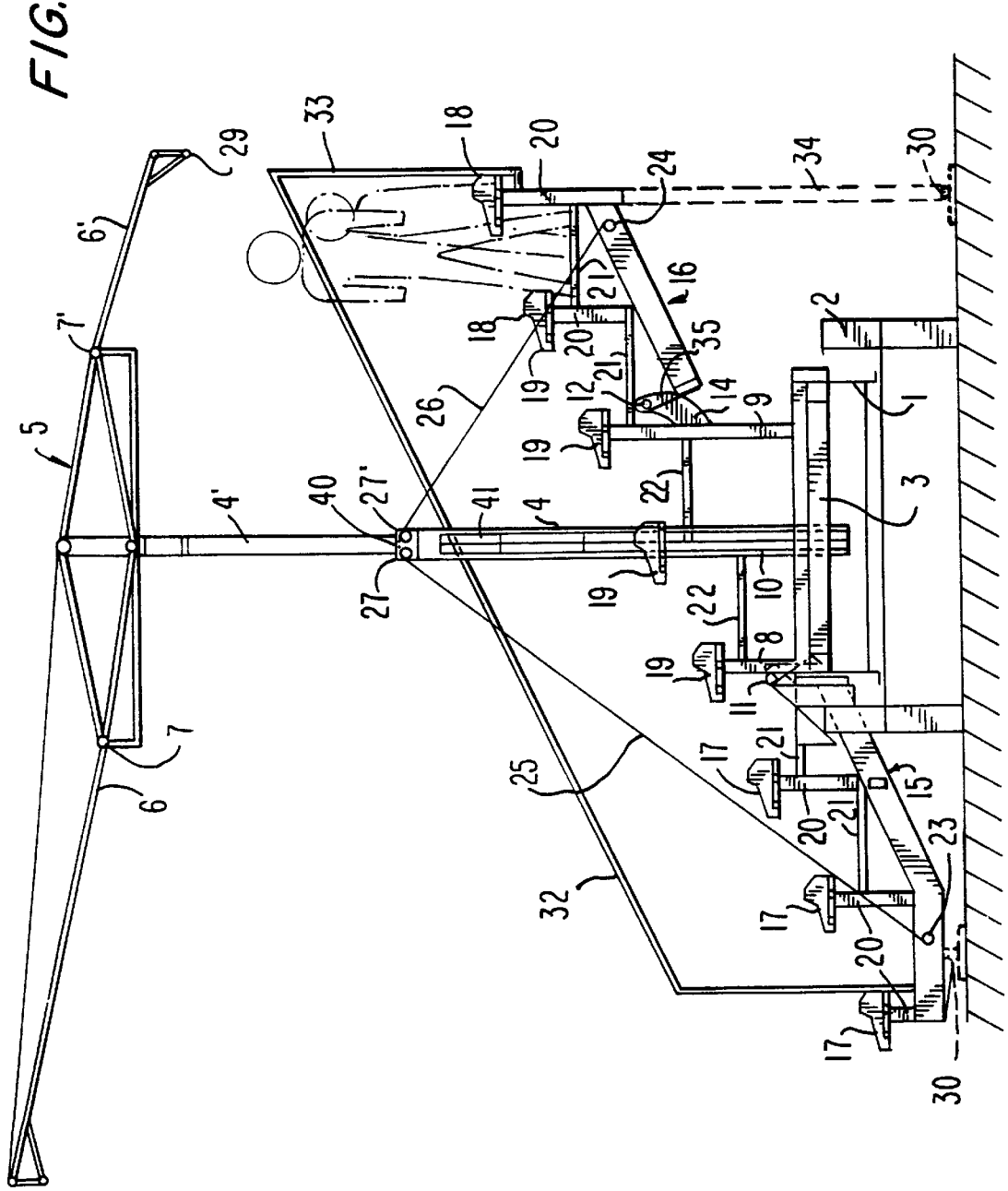

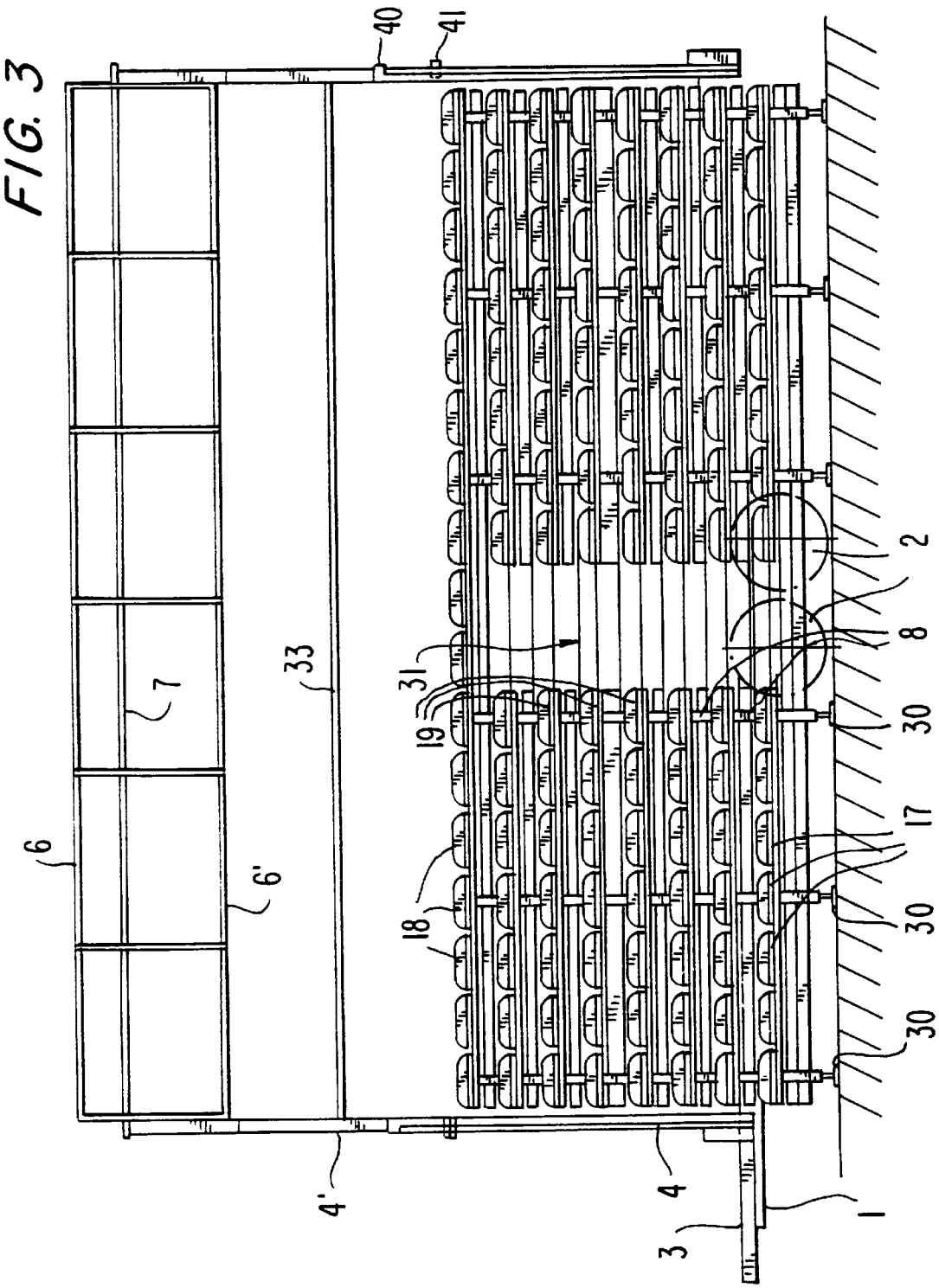

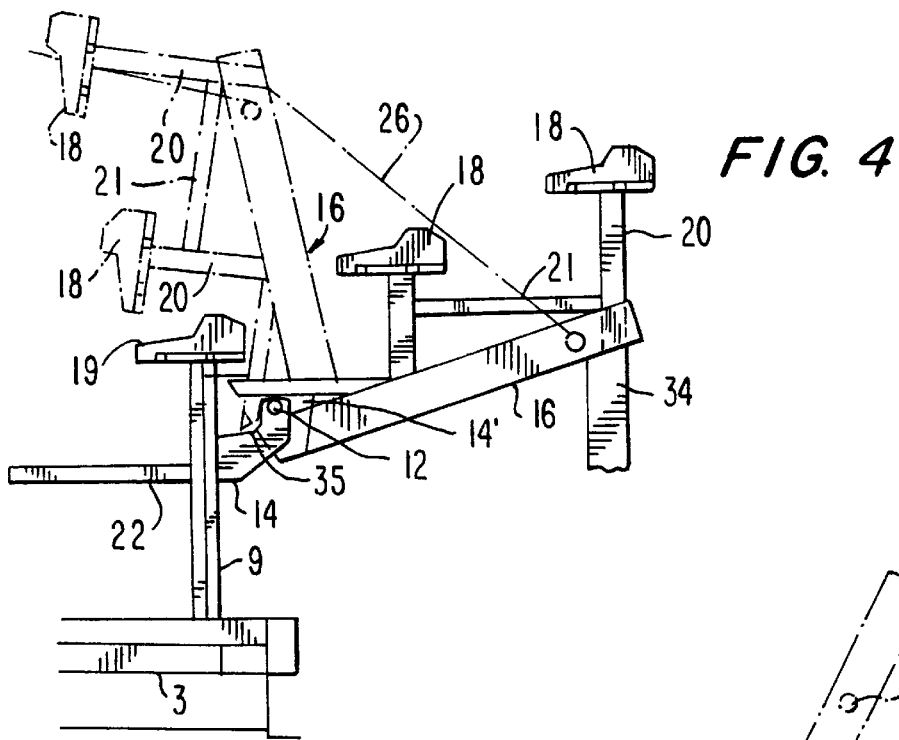
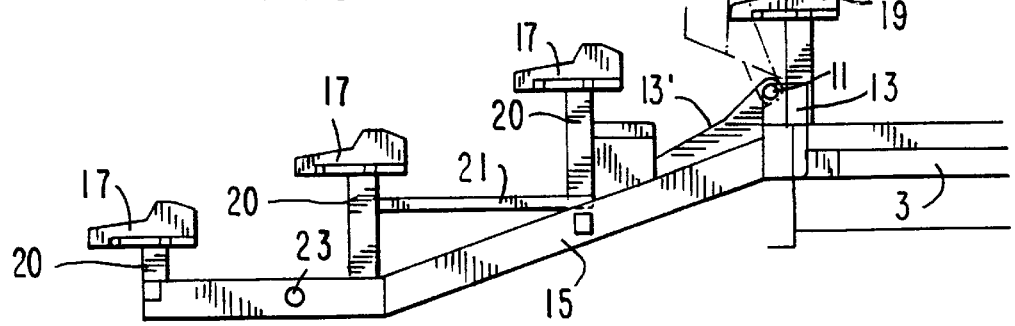

FOLDABLE AND MOBILE STEPS OR BLEACHERS STRUCTURE

This invention relates to a new and improved foldable and mobile steps or bleachers structure. It relates more specifically to a vehicle, such as a truck or a hauled trailer comprising a structure which, when folded, meets the legal dimension requirements, and when unfolded, provides a series of steps or bleachers which can be used as a grandstand for the audience of a cultured or sportive meeting. An important feature of such a structure is its ability to be folded and unfolded in a unique and simple operation taking only a few minutes.

Mobile foldable structures are known, as such for example trailers which can be transformed into stages. As an example, the European Patent Application No. 95440015.6, Publication No. EP-A-0789 118 of the Assignee discloses such a vehicle of the trailer type, which can be transformed into an expanded stage space, starting from the initial periphery of said vehicle which comprises an elongated underframe covered with a central floor, a central roof fixed to at least two couples of telescopic masts placed at both ends of the vehicle, two lateral side walls comprising each two panels, one of which is hinged along the upper lateral side edge of the wall and the other is hinged along the lower lateral side edge of the wall, means being provided to connect the raising of the roof and the swinging of at least one panel of each lateral wall, said vehicle being characterized in that connecting means comprise two mechanical systems combined with two sequential steps of expansion of the vehicle, a first step initiating the increase of height of the masts and the lateral swinging of at least two symmetrical panels and a second step completing said increase of height of the central roof and the simultaneous swinging of the said lateral panels until an horizontal position, said systems being controlled by at least one manual control element regulating the amplitude of the movement created sequentially by both systems during each manipulation.

As it is shown in FIGS. 3 and 4 of the above-mentioned European Patent Application, said structure, when unfolded, takes up a breadth and an height double of the breadth and height of the vehicle enclosing the same structure when folded, so that, on the one hand, the vehicle meets legal dimension requirements and, on the other hand, the unfolded structure provides a stage space of acceptable dimensions for a spectacle performance.

The unfolding or expansion of the structure is very simply obtained, means being designed to combine in the same manual operation both steps of the expansion of the vehicle, a first step initiating simultaneously the growing up of the telescopic masts or posts and the lateral swinging of at least two symmetrical panels and a second step completing the growing up of the central roof and the simultaneous swinging of said lateral panels until an horizontal position, said both systems being controlled by at least one manual control element allowing an adjustment of the amplitude of the movement created sequentially by both systems during each manipulation.

The present invention can be considered as an extrapolation of such a system to a different structure in view of a complementary application, i.e., the raising of steps or rows of seats forming a stand.

To this effect, the vehicle of the present invention being of the type comprising an elongated underframe covered by a central floor, a central roof attached to at least two couples of telescopic posts placed at the ends of the vehicle, and two lateral side walls hinged along the upper longitudinal edges of said roof, is characterized in that along the longitudinal edges of the central floor are erected upright elements upon the external faces of which can rotate, between a first folded position in which they are enclosed within said lateral side walls, and a second position in which they form a generally oblique substantially continuous structure, two longitudinal side floors supporting each at least two rows of seats substantially parallel to the longitudinal axis of the vehicle.

In such a structure, the expansion of the roof is obtained as it is known by growing up of the telescopic posts and opening substantially horizontally or along a slight common slope of the lateral side walls, whereas, according to the invention, both lateral floors open out from the inside towards the outside, to form a bleachers floor, by rotation along their longitudinal edges, said rotation, in the direction of said opening out, resulting from the sole own weight of said floors, whereas the folding of the same assembly is obtained by pulling at least one rope attached to their external longitudinal edges and connected to a mechanical system comprising a pair of pulley blocks, one being fixed to the movable part of the telescopic post, the other being fixed to the immobile part of said post.

More precisely, each end of one of said lateral floors is pulled by a rope or cable, one end of which is fixed to the movable pulley block, then winds around a pulley of the movable pulley block and finally winds around a pulley of the fixed pulley block, the other end being fixed to said floor.

The slope of both floors results also from the fact that their hinges are respectively at different heights on the longitudinal sides of the underframe, i.e., that the upright elements upon which they rotate are at different heights.

In fact, said upright elements of the longitudinal edges of the central floor upon which the lateral floors rotate are metal sections used as supports for fixed rows of seats.

The respective width of both floors will depend on the total breadth of the stand, taking into account safety regulations and the facts that the upper portion is out of plumb and the lower portion is at ground level.

In view to optimize the number of seats of the unfolded bleachers, further upright elements are placed between said upright elements of the longitudinal edges and support also the rows of seats.

The same elements or metal sections are placed upon the lateral floors, to be in upright position when said floors are unfolded.

In such a position, the latter abut the elements attached to the central floor.

To ensure the safety of the entire assembly of the invention in unfolded position, jacks and/or supporting beams are distributed longitudinally along the longitudinal external edges of the floors, to secure their stability and the strength of the unfolded assembly.

In addition, rails or fences are placed at the ends of each row of seats and behind the last upper row of seats.

Preferably, according to an additional feature of the invention, the central floor includes a removable towing hook, to provide means to hitch together and to a traction vehicle several similar floors which connected end-to-end will form a stand of the same height but of superior length.

Preferably, the roof can be slightly slant in a direction inverse of the slope of the bleachers, to form a protective canopy protecting against the bad weather.

Among the major technical advantages of this invention, which make it particularly attractive, one can cite:

The simultaneous positioning of two lateral floors which are not of the same width and not at the same level. It should be noted that the out-of-plumb one is supported by upright beams which connect its lower lateral edge to stabilizing supporting elements such as jacks. The simple fact that they abut against upright elements in unfolded position is however not sufficient to secure their good mechanical behavior, since the stresses supported by such a structure are considerable.

The rapidity of unfolding, which can be completed within approximately half an hour by two persons.

The final result of the invention is a grandstand for more than 120 persons, protected against the bad weather and foldable to be moved to another site by handling by a vehicle which can be driven without any special license.

The invention will now be described with reference to the attached drawings illustrating schematically one embodiment of the invention.

On this drawings

FIG. 2 is a schematic section of the same vehicle, showing the structure in unfolded condition in the form of a grandstand comprising bleachers equipped with seats and protected by a canopy;

FIG. 3 is a schematic front view of the unfolded grandstand, in the form of a trailer removed from its tractor and laying upon the ground, on the one hand by two pairs of central wheels, and on the other hand by supporting jacks;

FIGS. 4 and 5 are enlarged details of the side structures, in both conditions folded and unfolded.

Figure 1:
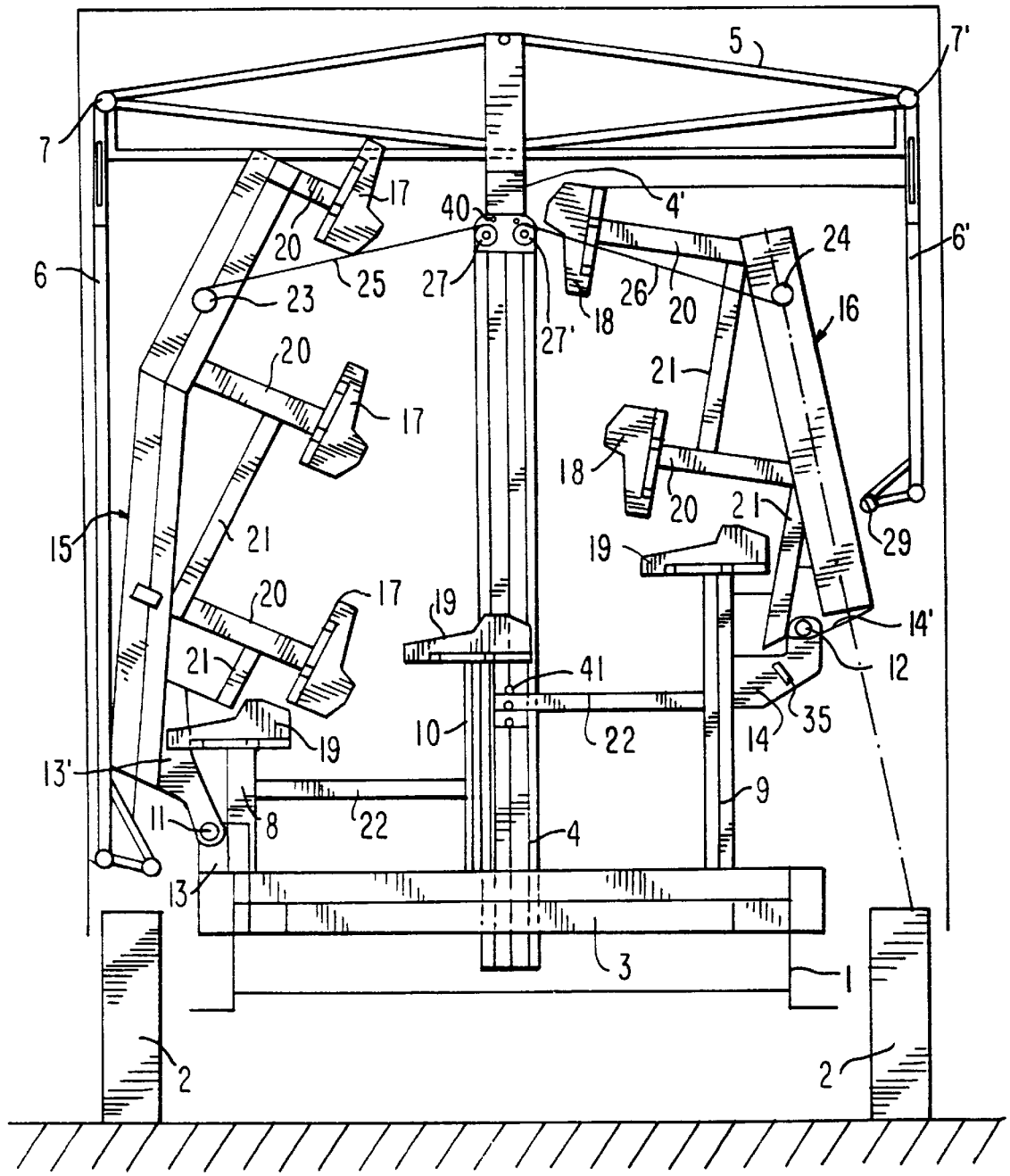
FIG. 1 is a vertical section of the vehicle of the invention, with the structure in folded condition.
Figure 6:
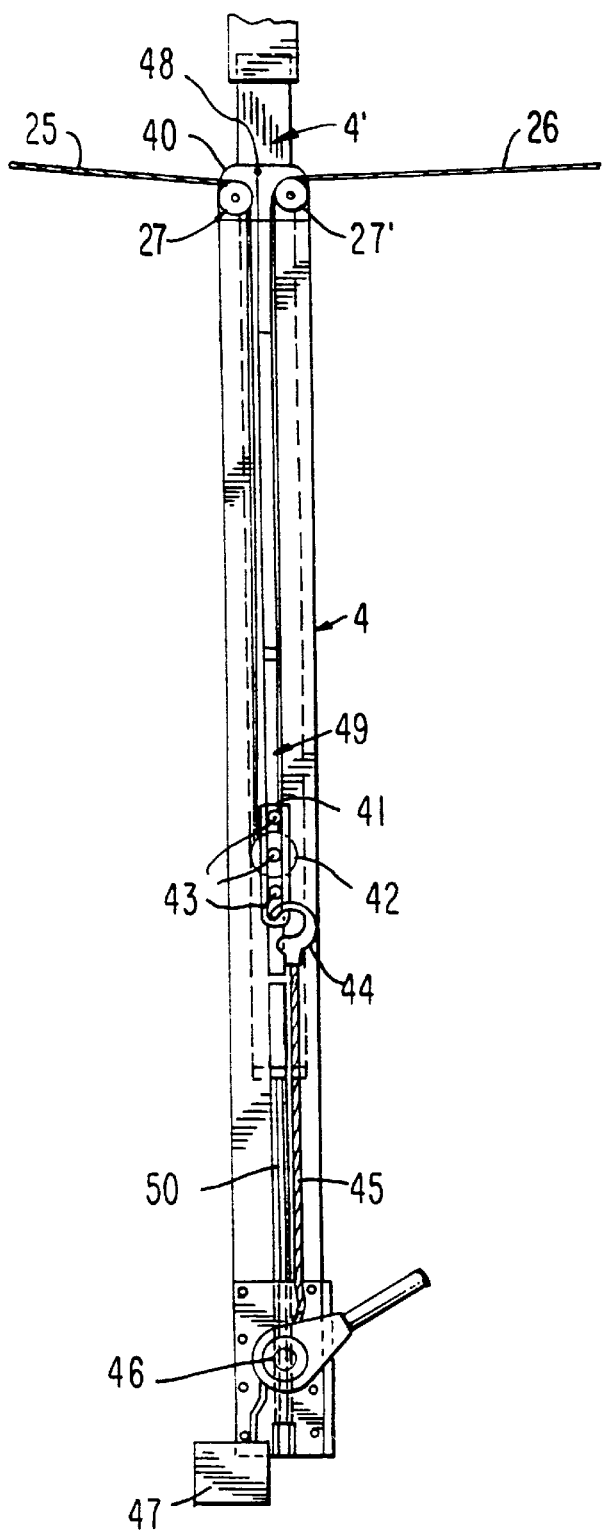
FIGS. 6 and 7 are respectively a front view and a side view of the mechanical structure, respectively with a mobile pulley block and a fixed pulley block.
Figure 7:
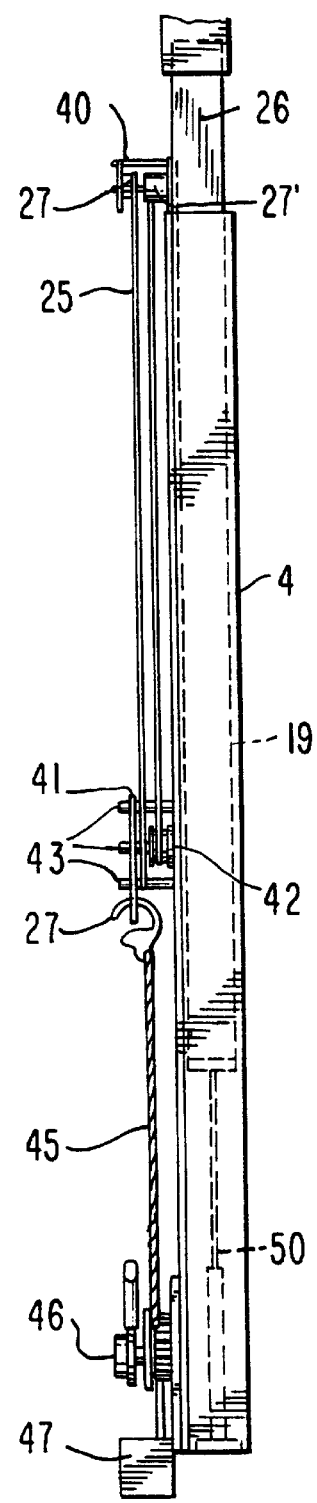

Referring to the drawings, it is shown, very schematically, the underframe 1 of a vehicle which can move upon wheels 2. This vehicle can be a truck, but is preferably a hauled trailer.

The underframe 1 supports a central floor 3 to which are attached telescopic posts 4–4', the lower part thereof 4 being fixed and the upper part 4' being mounted slidably movable in the lower part, through any known means, such as those described in the above-mentioned European Patent Application No. 95440015.6.

The upper part 4' of the post supports on one hand the central roof 5, and on the other hand upper side panels 6, 6', hinged along the longitudinal edges 7, 7' of said central roof. Said panels are made in a known manner of a structure of metallic beams covered by a canvas sheet, which also covers the central roof 5.

Panels 6, 6' in the folded condition (FIG. 1) are the lateral side walls of the vehicle, the upper part 4' of the post being fully engaged into the lower part 4. In this configuration, the vehicle is meeting all the legal requirements regarding the dimensions thereof. The vehicle appears as a banal truck or trailer, except a free space left between the external edge of panel 6' and the underframe 1. Said space is materially out of reach, due to the internal fitting out of the folded structure, as explained hereunder.

According to the invention, upon the floor are erected upright elements distribute longitudinally 8, 9, and 10, of various heights, and playing various functions, as explained hereunder.

Firstly, the longitudinal floors 15, 16 are pivotally mounted in 11, 12 externally to elements 8 and 9 and optionally through proper supports 13, 14 and can take two end positions i.e., a folded position, in which they are fully enclosed within the side walls, which are themselves vertically folded 6, 6' (FIG. 1), and an unfolded position, in which they open out to form two structures having the same slope (FIG. 2).

Upon said floors are mounted rows of seats 17 upon floor 15 and 18 upon floor 16, upon pedestals 20 mounted in such a manner they are all vertical in the unfolded position of the structure. Said pedestals 20 are connected by horizontal passageways forming intermediate floors upon which the users are walking.

On the other hand, the elements 10, extending longitudinally from one couple of post elements 4, 4' to the other post elements at both ends of the structure, are supporting, like vertical elements 8, 9, seats 19, which are also fixed, all said elements being connected by fixed horizontal passageways 22, which can additionally be used for the inspection of the structure in folded position.

The assembly of the slope floors 15, 16 of the upright elements/pedestals and of the horizontal passageways 21, 22 constitutes a complete grandstand, easy to transport in folded condition and easy to install in use configuration, as explained hereunder:

At the external longitudinal edges of floors 15, 16 are attached, respectively to beams 23, 24, ropes or cables 25, 26 which, through return pulleys 27, 27', can be used for the manipulation, through a winch 46 placed at the bottom of post 4, of the entire assembly. By a very fast unique manual maneuver, the structure can be brought from the folded condition to the unfolded condition and/or vice versa. To take account of the difference of length between ropes 25 and 26, it is used a pulley blocks structure which will be described in detail hereafter.

Unlike the usual roof structures, such as described in the European Patent Application referred to above, the roof combined with the bleachers structure of the invention takes when unfolded a configuration similar to that of roofs of fixed bleachers, e.g., in stadium. To this effect, the panel 6 is substantially longer than panel 6', to protect all the overall lower width of the grandstand, and said panel 6' is raised beyond and above the horizontal, so that the overall panels 6, 6' has a constant and continuous slope, being well understood that the lowest portion 29 of panel 6' is largely above the average height of a walking person, as illustrated in FIG. 2.

It should be noted in FIG. 1 that said end 29 of panel 6' substantially contacts the underside of floor 16 so that the sequence panel 6'—floor 16—elements 9 substantially provides a continuous corresponding side wall for the vehicle.

In the other hand, it should be noted in FIGS. 2 and 3 that in addition to wheels 2, the unfolded grandstand is laying on the ground through supporting jacks 30 longitudinally distributed under the external ends of floors 1 5 and 16. In the case of floor 16, said jacks are placed as a continuation of the upright beams 34 which directly support the out of plumb floor 16.

It should also be noted in FIG. 3 that a central passageway 31 comprising steps of standard height is positioned between two rows of seats.

Finally for obvious safety reasons, fences or rails 32, 33 are provided at each end of each row of seats and behind the last row. Such rails are for example formed by cylindrical beams regularly bolted along the corresponding edges.

Said rails or fences are fixed along the lateral sides of the stand. Reversely, along the upper longitudinal edge, they are foldable, for example by pivoting around axis fixed at the bottom of the upper seats.

It is well understand that, except for the legal dimension requirements, the dimensions of the elements of the structure of the invention can be varied depending on the use for which the stand is designed. The same applies to the number of said elements, i.e., the number of rows and of seats.

FIGS. 4a and 4b show more precisely the pivoting mechanism for the longitudinal side floors shown as 15 and 16. Upon said figures are shown both conditions, folded and unfolded, to make clear the amplitude of the movement.

In FIG. 4a, in addition to the elements shown and described hereabove, it is shown a pivot shell 14 comprising a stop 35 upon which abut, in unfolded position, the elements 14' fixes upon the lateral structure 16. Due to the weight, and of the resulting torque at the pivotment hinge formed by said shells placed at the top of upright elements 9, such an abutment 35 is not sufficient to secure the unfolded assembly. This is why beams 34 are added over the adjustable supporting devices 30.

FIG. 4a, as well as FIG. 4b, shows the circular movement amplitude and the resulting increase of usable area for the corresponding function.

In the FIG. 4b, the pivot shell 13, 13' is reversed: the portion 13' is integral with the structure 15 and the double envelope 13 is fixed to the central floor 3. In this case, the abutment is at the vertical face of the longitudinal edge of the metallic structure of said central floor 3. Due to the height of said lateral structure 15, no additional beams are provided in complement to the adjustable support devices 30. The latter provides on both faces an adaptation of the unfolded structure to irregular grounds.

FIGS. 5a and 5b show the structure of the pair of pulley blocks 40, 41, combined with the fixed portions 4 and the slidable portions 4' of the posts, viewed from the front and from the side. The pulley block 40 attached to the lower fixed portion 4 includes two pulleys 27 and 27' around which the ropes 25 and 26 are wound. The rope 26 is fixed at one end to a fixed point 48, from which it extends towards a pulley 42 of the pulley block 41 fixed to upper slidable portion 4'.

Said pulley block 41 is movable and includes three pins 43 slidable along a groove 49 in portion 4 of the post. The central pin 43 bears pulley 42 whereas lower pin is used as a fixed point for the end of rope 25.

At its lower end, the movable pulley block 41 comprises a hole in which engages a hook 44 placed at the end of a chain 45 connected to a handle 46. The nonused portion of the chain lays in a box 47 under said handle 46. At the lower part of the post portion 4, a device such a gas jack 50 can be provided to assist the first step of the unfolding operation, before the weight energy of the lateral floors be sufficient, as it is described in the Patent Application No. 95440015.6.

The structure thus described provides a double stroke for one of the floors, comparatively to the simultaneous stroke of the other floor. More precisely, the structure 15, which is the lowest, request a stroke of rope 25 longer than the stroke of rope 26 which pulls the higher structure 16.

It is well understood that the description which precedes is only a nonlimitating example of the invention, which can comprise the many modifications encompassed by the following claims, which are conceivable by the one skilled in the art.

I claim:

1. A system of grandstand with foldable bleachers, said system comprising an underframe (1) mounted on wheels (2) and supporting a central horizontal floor (3), upright elements (8, 9 ) on said floor (3), two pivotal longitudinal lateral floors (15, 16) externally mounted around horizontal axes (11, 12) on said upright elements (8, 9) and pivotable between a first configuration in which they are folded one towards another to form a space assembly meeting legal dimension requirements which apply to trailers, and which can be hauled by a vehicle comprising said underframe (1) and wheels (2), and a second configuration in which they are unfolded externally at different levels to form a generally plane and oblique structure, seats (17, 18) mounted on said lateral floors (15, 16) as said bleachers forming said grandstand, a central roof (5), means for supporting at least said central roof (5), means for supporting said means for supporting at least said central roof (5). said means for supporting at least said central roof (5) being movably attached to said means for support said means for supporting at least said central roof (5), aid means for supporting said means for supporting at least said central roof (5) being fixedly attached to said central horizontal floor (3), and means for folding and unfolding said lateral floors (15, 16) in a manual operation, said means for folding and unfolding said lateral floors (15, 16) being attached to said means for supporting at least said central roof (5) and to said means for supporting said means for supporting at least said central roof (5).

2. The system of the grandstand with the foldable bleachers according to claim 1, who said means for supporting at least said central roof (5) and said means for supporting said means for supporting at least said central roof (5) comprise at least two couples of telescopic posts (4, 4') placed at ends of said central floor (3), said central roof (5) being supported by said posts (4, 4'), the system of the grandstand with the foldable bleachers further comprising two panels (6, 6') hinged along longitudinal external edges of said central roof (5) forming lateral side walls, wherein said upright elements (8, 9) are mounted along longitudinal edges of said central floor (3), and upon external faces of said upright elements (8, 9) are hinged said lateral floors (15, 16) which, in said first configuration, are enclosed within a volume defined by said lateral side walls (6, 6'), and, in said second configuration, are forming a floor of said grandstand, said lateral side walls (6, 6') being raised to form a canopy for said grandstand.

3. The system of the grandstand with the foldable bleachers according to claim 2, wherein said system further comprises fixed rows of seats (19), the upright elements (8, 9) along the longitudinal edges of the central floor, around which the lateral floors (15, 16) are pivoting, being metal sections supporting said fixed rows of seats and being of different heights.

4. The system of the grandstand with the foldable bleachers according to claim 3, further comprising upright elements (10) of metal section distributed between the upright elements (8, 9) along the longitudinal edges and supporting at least one of said fixed rows of seats (19).

5. The system of the grandstand with the foldable bleachers according to claim 2, wherein said system further comprises rows of said seats (17, 18), said lateral floors (15, 16) comprising pedestals (20) in metal section supporting said rows of seats (17, 18), which are mounted on said lateral floors (15, 16) in such a manner that said rows of seats (17, 18) are upright in the second configuration.

6. The system of the grandstand with the foldable bleachers according to claim 1, further comprising elements (35) which are fixed to the central floor (3), said lateral floors (15, 16) being in abutment against said elements (35) when said lateral floors (15, 16) are in said second configuration.

7. The system of the grandstand with the foldable bleachers according to claim 1, further comprising jacks (30) or supporting beams (34) distributed longitudinally along external longitudinal edges of the central horizontal floor (3) and the pivotal longitudinal lateral floors (15, 16) to secure stability and strength of the generally plane and oblique structure.

8. The system of the grandstand with the foldable bleachers according to claim 1, further comprising rails or fences (32, 33) and rows of said seats, said rails or fences (32, 33) being placed at ends of each row of said rows of seats and behind a last upper row of said rows of seats.

9. The system of the grandstand with the foldable bleachers according to claim 8, wherein said rails or fences are fixed along lateral sides of the grandstand.

10. A system of grandstand with foldable bleachers, said system comprising an underframe (1) mounted on wheels (2) and supporting a central horizontal floor (3), upright elements (8, 9) on said floor (3), two pivotal longitudinal lateral floors (15, 16) externally mounted around horizontal axes (11, 12) on said upright elements (8, 9) and pivotable between a first configuration in which they are folded on towards another to form a space assembly meeting legal dimension requirements which apply to trailers, and which can be hauled by a vehicle comprising said underframe (1) and wheels (2), and a second configuration in which they are unfolded externally at different levels to form a generally plane and oblique structure, seats (17, 18) mounted on said lateral floors (15, 16) as said bleachers forming said grandstand, and means for folding and unfolding said lateral floors (15, 16) in a manual operation, wherein the means for folding and unfolding the lateral floors (15, 16) comprises a system acting through pulling upon ropes or cables (25, 26) fixed at a longitudinal external edge of each lateral floor (15, 16) at each end thereof and controlled at couples of telescopic posts (4, 4').

11. The system of the grandstand with the foldable bleachers according to claim 10, wherein said system further comprises a mechanical system at each end of the grandstand, said ropes (25, 26) being connected to said mechanical system comprising a pair of pulley blocks (40, 41), a first of which being fixed to a slidably movable portion (4')and a second of which being fixed to an immobile portion (4) of each couple of telescopic posts (4, 4').

12. The system of the grandstand with the foldable bleachers according to claim 11, wherein each end of a first of said lateral floors (15) is pulled by one of said ropes (25), a first end of said one of said ropes (25) being fixed to said first of said pair of pulley blocks which is movable (41) and winding around a pulley (27) of said second of said pair of pulley blocks which is fixed (40), a second end of said one of said ropes (25) being fixed to said first of said lateral floors (15).

13. The system of the grandstand with the foldable bleachers according to claim 11, wherein each end of a second of said lateral floors (16) is pulled by one of said ropes (26), a first end of said one of said ropes (26) being fixed to said second of said pair of pulley blocks which is fixed (40), then winding around a pulley (42) of said first of said pair of pulley blocks which is movable (41), and finally winding around a pulley (27) of said second of said pair of pulley blocks which is fixed (40), a second end of said one of said ropes (26) being fixed to said second of said lateral floors (16).

\* \* \* \* \*